F. P. MARTIN.
MOLD.
APPLICATION FILED MAR. 20, 1912.
1,074,885.
Patented Oct. 7, 1913.
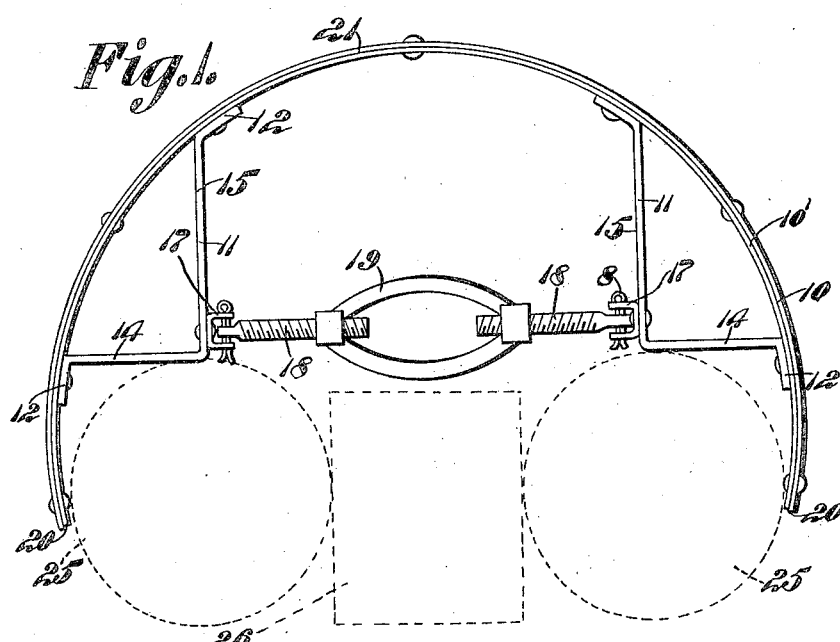
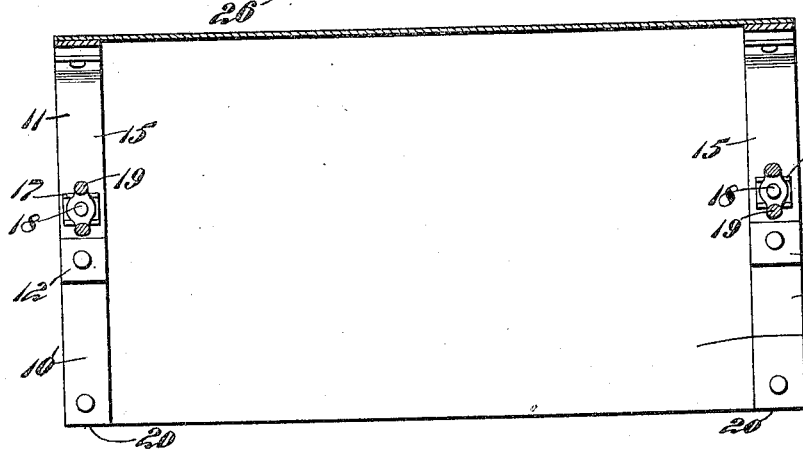
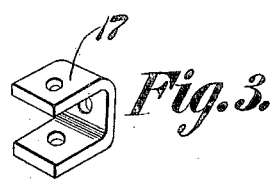
Witnesses
F. P. Martin,
Inventor
by C. A. Snow & Co.
Attorneys

UNITED STATES PATENT OFFICE.

FRANK P. MARTIN, OF WILLIAMSBURG, KANSAS.

MOLD.

1,074,885.

Specification of Letters Patent.

Patented Oct. 7, 1913.

Application filed March 20, 1912. Serial No. 685,042.

*To all whom it may concern:*

Be it known that I, FRANK P. MARTIN, a citizen of the United States, residing at Williamsburg, in the county of Franklin and State of Kansas, have invented a new and useful Mold, of which the following is a specification.

This invention relates to an improvement in molds and is designed to co-act with such molds as that illustrated in my former Patent 1,006,248, granted October 17th, 1911, to form an arch.

The primary object of the present invention is to provide means which is adjustable and which co-acts with other adjustable tubular molds shown in the above mentioned patent, to form a culvert, either the first mentioned means or the molds of said patent, being adjusted to vary the curvature of the crown of the molded arch.

With the foregoing and other objects in view which will appear as the description proceeds, this invention resides in the novel construction and combination of parts hereinafter described and claimed, it being understood that changes in the precise embodiment of the invention herein disclosed can be made within the scope of what is claimed without departing from the spirit of the invention.

In the drawings, forming a part of this specification,—Figure 1 is an end elevation. Fig. 2 a longitudinal section. Fig. 3 a detail view of one of the brackets which pivotally support threaded bolts of the turn buckle.

In the drawings, 10 designates a substantially semi-circular mold section, of any suitable length, around which the material is clamped to form arches of concrete or like material. Disposed adjacent each terminal of the member 10 is a band 10' to which is secured a pair of angle irons or elbows 11, the offset ends 12 of said irons being bolted or otherwise secured to the member 10, the short arms 14 of the irons being disposed in the same plane, the arms 15 being disposed parallel to each other. Secured to each of the arms 15 at a point adjacent their base is a bracket 17, which pivotally supports the screw threaded bolts 18 which are received by the turn buckle 19, the edges 20 of the member 10 being spaced by manipulating said turn buckle, the spacing of said edges drawing the intermediate portions 21 toward the turn buckle.

The device is designed for forming arches and while the same may be supported in any suitable manner to receive the material from which the arch is formed, the same is preferably supported upon a plurality of collapsible tubular molds such as are illustrated in the above mentioned patent. These molds 25 which are shown in dotted lines are disposed adjacent the edges 20 of the member 10, the short arms 14 of the angle bars or elbows 11, resting upon molds 25, the block 26 shown in dotted lines may be interposed between molds 25 to space the same and form a rigid support. It will be noted that when the member 10 registers upon the molds 25, the turn buckle 19 may be adjusted to space the edges 20, the arcs may be lowered without distending the edges 20 by collapsing the mold 25, thus obtaining the fixed configuration of the member 10 and producing a lower arc.

When it is desired to produce a lower and broader arc the diameter of the member 26 may be increased and the member 10 extended by manipulating the turn buckle 19. It will also be noted that when used in connection with the molds of the above mentioned patent the device may be adjusted in various ways to form arches of different widths and height.

Attention is called to the fact that a mold of this character may be readily positioned to receive the material and be withdrawn after the arch is formed.

It will also be noted that a device of this character may be easily and economically manufactured and that the various parts may be readily assembled.

Having thus described the invention what is claimed as new is:—

A mold comprising a flexible sheet member, flexible bands secured to said member and disposed adjacent the terminal ends thereof, a plurality of elbows secured to each of said bands, said elbows having arms of material length adapted to rest upon supports of varying widths, threaded rods and a turn buckle connected thereto connected to said elbows, adapted to vary the configuration of the sheet and consequently of the structure molded.

In testimony that I claim the foregoing as my own, I have hereto affixed my signature in the presence of two witnesses.

FRANK P. MARTIN.

Witnesses:
 A. F. DEHU,
 R. G. WARWICK.

Copies of this patent may be obtained for five cents each, by addressing the "Commissioner of Patents, Washington, D. C."